April 30, 1963 S. D. SCHELL 3,087,767

SECRETARIAT CONVERTIBLE CABINETS

Filed May 18, 1961 5 Sheets-Sheet 1

INVENTOR.
SAMUEL DUVALL SCHELL

BY [signature]

ATTORNEY

SECRETARIAT CONVERTIBLE CABINETS

Filed May 18, 1961 5 Sheets-Sheet 2

INVENTOR.
SAMUEL DUVALL SCHELL

BY [signature]

ATTORNEY

April 30, 1963 | S. D. SCHELL | 3,087,767

SECRETARIAT CONVERTIBLE CABINETS

Filed May 18, 1961 | 5 Sheets-Sheet 3

*INVENTOR.*
SAMUEL DUVALL SCHELL

*BY* [signature]

*ATTORNEY*

SECRETARIAT CONVERTIBLE CABINETS

Filed May 18, 1961

INVENTOR
SAMUEL DUVALL SCHELL

BY [signature]

ATTORNEY

*INVENTOR.*
SAMUEL DUVALL SCHELL

*BY*

*ATTORNEY*

United States Patent Office 3,087,767

Patented Apr. 30, 1963

3,087,767

SECRETARIAT CONVERTIBLE CABINETS

Samuel Duvall Schell, 1901 Columbia Road NW., Washington, D.C.

Filed May 18, 1961, Ser. No. 111,046
5 Claims. (Cl. 312—240)

The present invention relates to a secretariat-convertible cabinet so constructed and designed as to provide an attractive article of furniture in the form of a multiple use cabinet for the office, or for the living room or library of the home and which may be quickly converted into either a mobile secretarial desk for typewriters, with necessary accessories, or into a mobile beverage bar, and tenders the necessary accessories for use; and, conversely, when closed, acts as a dust protective storage container for the typewriter or the beverages and the accessories. The cabinet may also be converted for use as a coffee-break bar.

In recent years the use of typewriting machines in homes has increased manyfold for personal correspondence, for record keeping, story writing, for preparation of papers by children in their studies and for a multitude of other typing items required to be performed at home; and, since most modern homes are small houses or apartments, it is often a problem to provide an adequate place for the convenient use and storage of such a machine, together with the necessary accouterments or supplies in a manner which is not offensive or detracting from the environment and furnishing-decor of the room where it may be more conveniently placed and used.

Therefore, it is the object of the present invention to provide a new improved secretariat-convertible cabinet that will be highly desirable and acceptable as an attractive ornamental article of furniture designed to harmonize with usual types of standard office and home furniture, when in a closed condition, and, when opened, will uncover a machine and all necessary accessories in position for immediate use and serve as a table or desk supporting said machine for the utilitarian purposes of performing work thereon; or which, when opened, can be transformed into a beverage bar, with the necessary accouterments, for the mixing and serving of beverages therefrom; and which, when closed will provide a self-contained storage cabinet with its contents of either adaptation of use in orderly stored position and concealing from view and protecting them from dust, dirt and damage, and again becoming an attractive article of furniture upon which a lamp or other object d'art may be supported.

Another object of the invention is to construct a cabinet, as just described, in an economical and compact manner to form a cabinet of relatively small dimensions, when closed, and which has unfoldable parts that may be spread apart to make accessible for use instrumentalities supported and contained within said cabinet and to provide a table-like surface with accessory shelves and racks, and with either a knee and leg open space so that the user may sit at the table and perform the desired work or a beverage bar by merely the opening or unfolding the parts thereof; and, upon closing said parts, is reconverted to a closed attractive cabinet.

With these and other objects in view, as will appear as this specification proceeds, the invention resides in the sundry details of the new and novel construction and in the novel organization and combination of parts thereinafter described.

For a better understanding of the following description, reference will be made to the accompanying drawings, which illustrate the forms of the invention as now devised and in which.

Figures 1, 2:
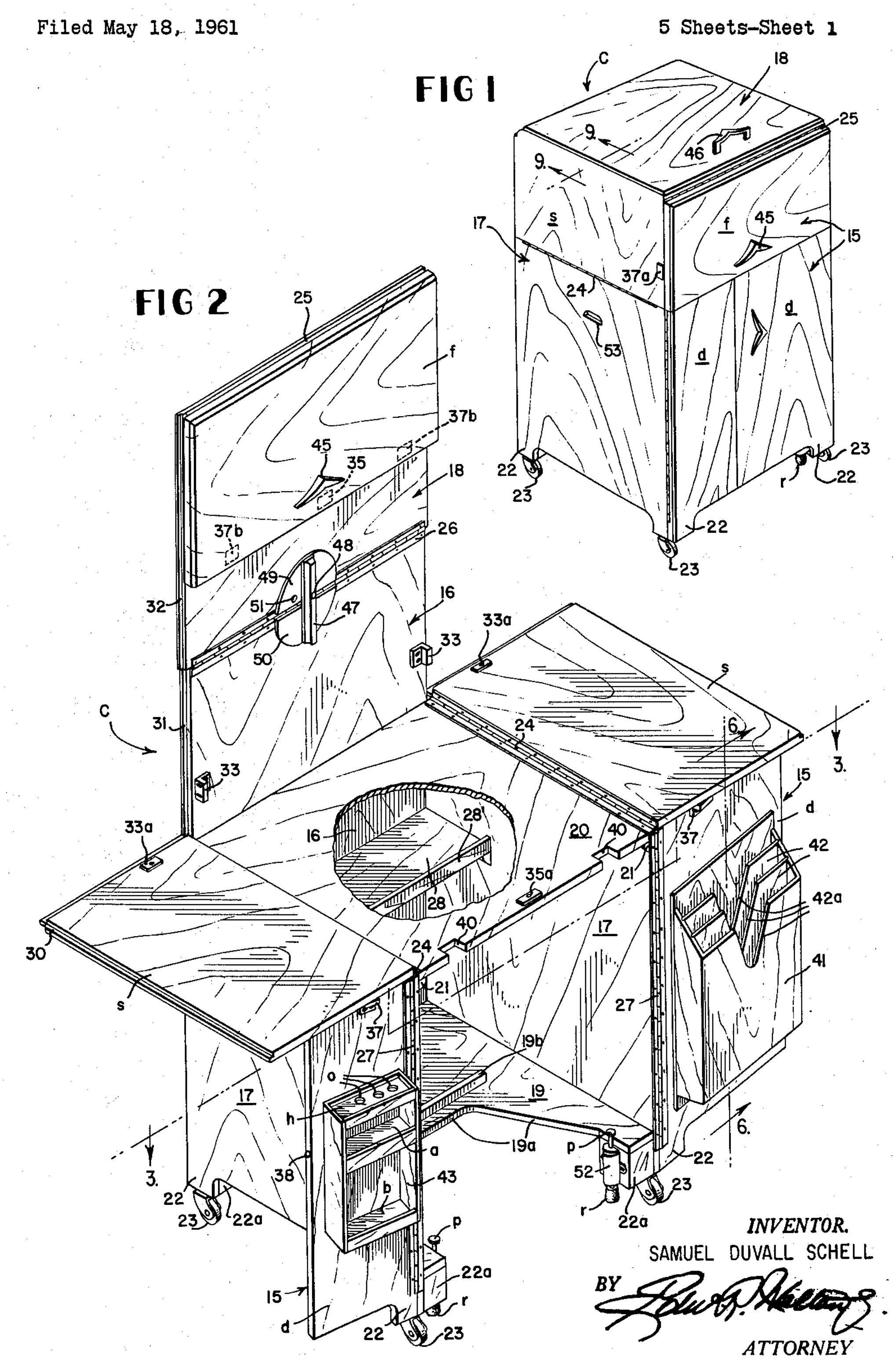
FIGURE 1 is a perspective view showing the cabinet of this invention in its folded or closed condition to serve as an attractive and ornamental article of furniture.
FIGURE 2 is a perspective view showing the cabinet illustrated in FIGURE 1 in its unfolded or open extended condition providing knee-hole type desk or table with lateral pedestal-like table-surface extension on each side having vertical racks for pertinent accessories facially on said pedestal-like extension and readily accessible to the user sitting at the knee-hole desk.

With specific reference to the drawings, wherein like characters of references refer to similar and like parts throughout the several views, C denotes the convertible cabinet of the commode-type as particularly shown in FIGURE 1 in its closed position or condition to serve as an ornamental article of furniture.

The cabinet C is generally four-square upright shaped in form and comprises basically a front wall 15, a rear wall 16, side walls 17, a top wall 18, a bottom wall 19 and an interior horizontal partition 20 dimensioned to fill the space within the cabinet between its front, rear and side walls and secured to said rear and side wall, as at 21, to provide a table-like supporting surface at a point upwardly in the cabinet about two-thirds (⅔) the distance of its height, (in the preferred embodiment of the invention, about 25 inches above the floor) as well as to complement the bottom wall 19 in bracing the cabinet structure. The lower wall portions of the cabinet may be formed or shaped in any suitable manner to provide feet reinforced by bracket blocks 22*a*, which feet preferably have casters 23 inserted therein to render the cabinet easily movable from place to place for convenient use. The walls of the cabinet C may be made of any suitable material, preferably of wood, whose surface may be smooth finished or decorated in any manner or manners to harmonize with various colors, styles and types of home or office furniture and, when closed as shown in FIGURE 1, will provide an attractive harmonizing cabinet that may serve as a stand or support for a lamp or other art objects.

An important feature of the cabinet C is to have its front wall 15, below the top level of the partition 20, composed of two hinged doors, the top wall 18 hinged to the rear wall 16, and the upper portion of the front wall 15 carried by the distal edge of its top wall 18, and side walls above the partition 20 mounted to swing outwardly from the position shown in FIGURE 1 to form extensions of the table-like partition 20 for the purpose of providing a typing-desk or a beverage-bar buffet, when converted to the position shown in FIGURE 2.

To this end, the portions of the front wall 15 and the two side walls 17 are composed respectively of separate sections *f* and *s* which extend upwardly from the partition 20, each side wall section *s* having its lower edges hinged to the adjacent edge of the side wall 17, preferably by means of piano-hinges 24, to swing downwardly and outwardly of the cabinet, while the upper edge of the front wall section *f* is similarly hinged, as at 25, to the front or distal edge of the top wall 18, which, in turn, is similarly hinged at 26 to the upper edge of the rear wall 16 so as to swing upwardly into planar alignment with the rear wall and carrying with it the front section *f* which swings downwardly to a substantially vertical position. Also, the lower portion of the front wall 15 (i.e., the remaining portion below the separate front section *f*) is composed of two door-panels *d*, each having an edge portion hinged, as at 27, to the front vertical edge of its adjacent side walls 17, respectively, so that said door-panels *d* may be swung outward and under the separate side wall sections *s*, respectively, to support them in a horizontal position, when the cabinet is opened as shown in FIGURES 2, 3, 5 and 12. Piano hinges are employed not only for the added support and reinforcement they afford, but to form a dust-tight joint to protect the articles stored when the cabinet is closed.

As will be observed, particularly in FIGURE 2, the bottom wall 19 of the cabinet has a medial portion cut away, as at 19*a*, inwardly for a distance on converging lines spaced from its side edges to provide sufficient room into which the feet and legs of the user may extend, when sitting at the opened secretariat-desk, while providing a shelf area at the rear portion upon which items may be placed for storage or display purposes. Immediately to the rear of the cut-away portion 19*a* a raised strip or rib 19*b* is provided to retain the items thereon and prevent them from falling into the cut-away portion 19*a*. It will be noted that the bottom wall 19 is of such configuration and extent that it also serves as a material bracing member, together with the partition 20, for the cabinet in either of its positions, shown in FIGURES 1 and 2. Also, a shelf 28 is provided within the cabinet and disposed substantially medially between the bottom wall 19 and the partition 20 and spaced therefrom, and which extends transversely across the rear wall 16 from side wall to side wall 17 for the receipt of extra accessories and supplies which may be required in the use of the cabinet in its convertible position for utilitarian purposes. The shelf 28 has an upstanding front-edge strip 28′ to prevent articles from sliding off said shelf.

Figure 9:
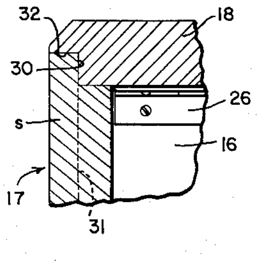
FIGURE 9 is a section view taken on line 9—9 of FIGURE 1 to illustrate the interfitting construction of the foldable side and top sections of said cabinet.

The top and rear edges of the side wall sections *s* are rabbeted on their inner edge faces, as at 30 FIG. 2, so that, when the side wall sections *s* are raised to the position shown in FIG. 1, they will fit into complementally rabbeted upper side edges 31 on the rear wall 16 and rabbets 32 on the side edges of the top wall 18, when the latter is moved from the position shown in FIGURE 2 to the position shown in FIGURE 1 for the purpose of better excluding dirt and dust from the interior of the cabinet. A detail of this rabbeting construction is shown in FIGURE 9.

The swingable side wall sections *s* are held in their vertical closed position by suitable fasteners 33—33*a*, such as magnetic-latches, which are mounted on adjacent inner-face marginal portions of the rear wall 16 and of said hinged side wall sections *s*. If the fasteners 33—33*a* are magnetic-latches as shown, it is preferred to have the cooperating pole-piece plates thereof mounted on the side wall sections *s*. Similarly, the lower edge of the front wall section *f* has a fastener, preferably in the form of a magnetic-latch 35, on its inner face at a central point along its lower edge to cooperate with a pole-piece plate 35*a* mounted on the front edge of the partition or table 20 so as to hold the front section *f* in its closed position.

Figure 6:
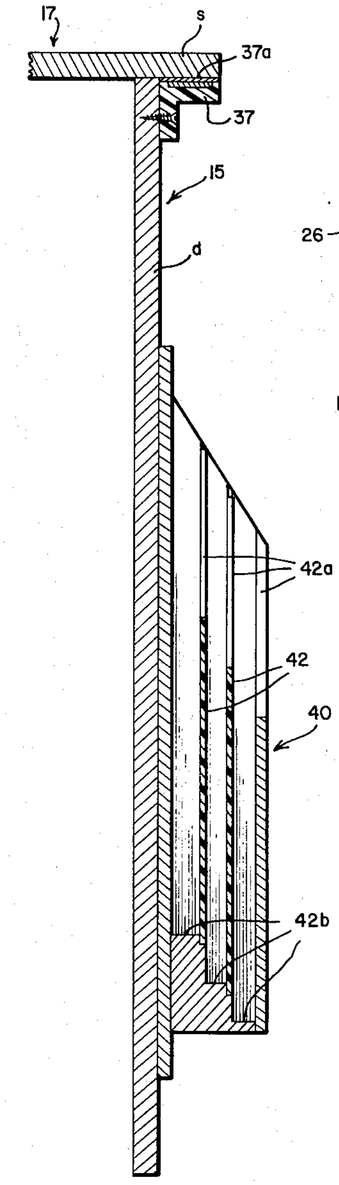
FIGURE 6 is a vertical sectional view taken substantially on line 6—6 of FIGURE 2.

The door panels *d* are each provided on their inner face at their upper edges with a magnetic-latch 37 which cooperates with a pole-piece plate 37*a* on the outer face of the swingable side-wall sections *s* at their forward edge portions, as shown more particularly in FIGURES 1, 2 and 6, to hold the doors *d* in open supporting engagement with the sections *s* when the latter are in their table-extension position. In order to maintain the door panels *d* in closed position, these magnetic-latches 37 cooperate with pole-piece plates 37*b* provided on its inner face of the lower edge of the front wall section *f*, when said doors *d* and said wall section *f* are in closed position as shown in FIGURE 1, thus providing an additional means for retaining the front wall section *f* in closed position. The front edge of the partition 20 is suitably notched, as at 40, FIGURE 2, to accommodate the magnetic-latches 37 when the door panels *d* are in closed position.

The inner face of the right-side door panels *d*, shown in FIGURE 2, is formed with, or otherwise has secured to it, a partitioned vertical pocket 41 or the type for receiving sheets of paper, envelopes, carbon paper and other tissues. The pocket 41 is open at its upper end and slanted with an outward declination to enable the top edges of the tissue or paper sheets to be readily accessible, the removable partitions 42 being provided with V-shaped notches 42*a*, as well as the bottom wall areas between the several partitions 42 being stepped, as shown at 42*b* in FIGURE 6, to assist in this connection.

The inner face of the other or left-side door panel *d*, as shown in FIGURE 2, carries a rack-type shelf 43 having at least two shelves *a* and *b*, preferably of different spacing and surmounted by a holder-ledge *h* provided with a series of openings *o* for the reception of pencils, pens or other similar objects.

Then the cabinet C is opened to the position shown in FIGURE 2, its front wall section *f* is swinging outwardly by means of the handle 45 and its top wall 18 raised by handle 46, from its position shown in FIGURE 1, and swung backward on the hinge 26 carrying with it the front wall section *f* which then swings downwardly.

Figure 7:
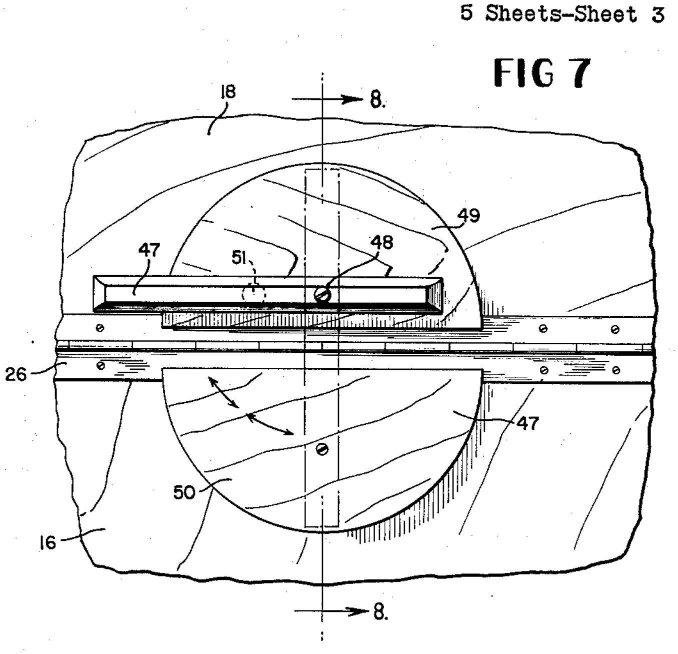
FIGURE 7 is an enlarged view illustrating one means for retaining the top-section of the cabinet in opened and elevated position.
Figure 8:
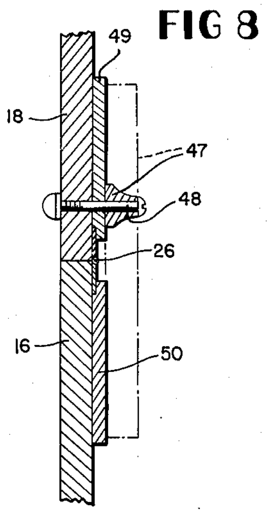
FIGURE 8 is a section view taken substantially on line 8—8 of FIGURE 7.

When the top wall 18 is in planarity with the rear wall 16 and with their adjacent edges in full abutting contact, the top wall 18 is held in that position by means of a holding device, which is here shown in the form of a pivoted bar 47 having a pivoted 48 offset from its central portion and secured to the inner face of the central rear marginal edge portion of said top wall 18. The bar 47 is of such length, beyond its pivot 48 that, when it is rotated from its normal position, shown in FIGURE 7, to its holding position, shown in FIGURE 2, the end portions of the bar engage a considerable surface area of the rear wall portion 16 and of the top wall 18 and, therefore, forms a substantial brace for maintaining the top (and the front section *f*) in a vertical position shown in FIGURE 2. The area of contact of the bar with the surface of said walls may be provided with a semi-circular wear-plate sections 49 and 50, respectively. A rounded projection 51 is provided on the wear-plate 49, which engages the under-surface of the bar 47, when it is in its inoperative horizontal position, to bind it firmly in that position against accidental displacement. Since the bar 47 is in a vertical position, when in its holding position with its heavier side lowermost, because of the heavier portion being below the point of pivot, it will retain that position until deliberately moved to its horizontal position.

In order to maintain the cabinet C in a firm fixed position, with respect to the floor or other supporting surface, when in opened position, stops 52 may be employed; and they may be in the form of conventional door-stops comprising a spring-loaded plunger *p* having an antifrictional rubber stop-member *r* for engaging the floor and a latch member *m*, which, when depressed, permits the stop to be released under the bias of the plunger. One of these stops 52 is mounted on each of the front feet blocks 22a so as to be obscured from view when the cabinet is in its closed position, but readily accessible to a foot of the user when the front doors *d* of the cabinet are opened.

In addition to the fastening means 37 and 37b, the distal edges of the door panels *d* are provided with cooperating latch means 38—39, preferably in the form of a spring-pressed detent of the so-called "bullet type," in order to releasably maintain the door panels in planar alignment, when fully closed. Also, a suitable handle means 53 may be provided on each of the fixed side walls 17 for the purpose of facilitating the movement of the cabinet from place to place.

Figure 10:
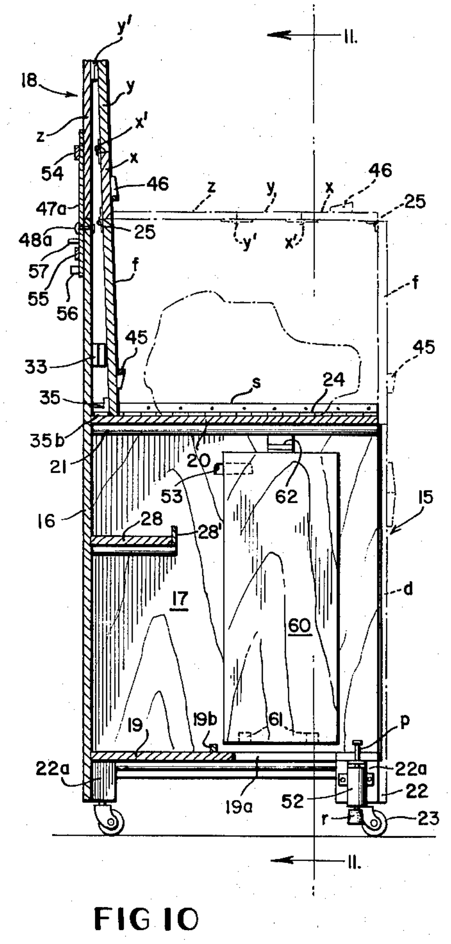
FIGURE 10 is a vertical sectional view, similar to FIGURE 4, but illustrating a modified form of the cabinet, in opened position.
Figure 11:
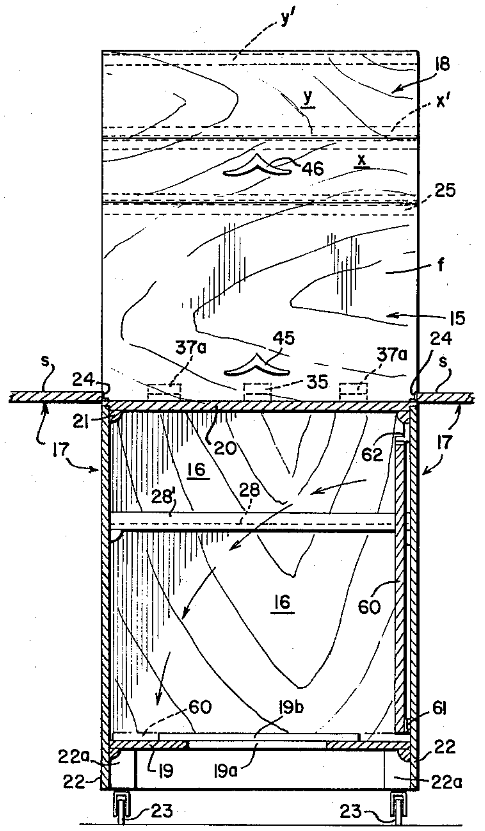
FIGURE 11 is a vertical sectional view taken substantially on line 11—11 of FIGURE 10.
Figure 12:
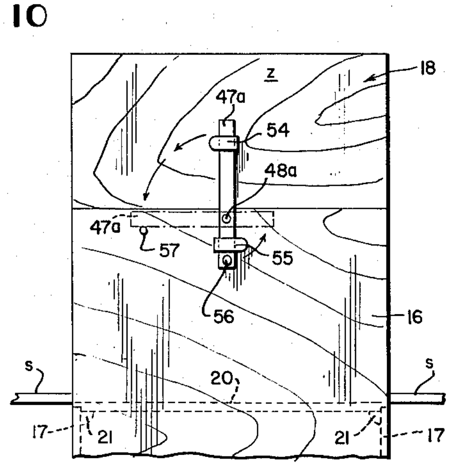
FIGURE 12 is an enlarged fragmentary rear view of the upper portion of the modified cabinet shown in FIGURES 10 and 11 and illustrating a modified means for holding or retaining top section of the cabinet in its opened or elevated position.

In FIGURES 10, 11 and 12, the secretariat-convertible cabinet is substantially the same as previously described, except its top-wall holding means have been modified and a means has been included to cover the cut-out portion 19a in the bottom wall 19 to provide additional surface area for storage of items, such as when the cabinet is used as a beverage-bar buffet.

It has been found that it may be desirable, in some instances to have the front wall section *f* rest on the partition 20, when the cabinet is in open position. This reduces the height of the upwardly extending top wall 18, when the cabinet is opened, thus enhancing the appearance and also relieving the suspended weight of the front wall section *f* from the hinges 25 and 26 and from the holding means 45. To accomplish this, the top wall 18 is composed of three transverse foldable hinged sections *x*, *y* and *z*, the rear section *z* having a width of about one-half (½) the dimension of the said top wall 18 from its front edge to its rear or hinged edge, and the sections *x* and *y* being of a width one-half the front-to-back dimension of the rear section *z*, said sections being hinged together at their adjacent edges as at *x'* and *y'* and the rear section *z* being hinged to the upper edge of the rear wall 16 as at 26. This style of construction permits, when the top wall 18 and front wall section *f* are lifted by grasping the handles 45 and 46, a folding of the top wall sections *x* and *y* in a manner that will permit the front wall section *f* to be folded and slid down behind a typewriter or other objects that may be on the table-surface of partition 20 and permit the lower edge of said front wall section *f* to contact and rest upon said surface, as shown particularly in FIGURES 10 and 11, where the magnetic-latch 35 will contact a pole-piece plate 35b on the table surface 20 adjacent the rear wall 16. Conversely, the cabinet may be closed in the same manner, reversed, without removing the typewriter or other objects from the table surface 20.

In order to sustain the folded top section *z* in its planar position relative to the rear wall 16 as shown in FIGURES 10 and 11, a thin rigid bar 47a is disposed on the rear surface of the rear wall and pivoted thereto intermediate its ends by a pivot pin 48a, so as to make one portion of the bar heavier than the other. A U-shaped spring-clip 54 has one leg secured to the top surface of the rear edge portion of top section *z*, and a similar clip 55 has one leg secured to the back face of the rear wall 16, these clips being so arranged as to receive the end portions of the bar 47a in the spaces between their legs, when said bar is rotated from its horizontal position to a vertical holding position as shown particularly in FIGURE 13. A knob 56 is provided on the longer end of the bar 47a for grasping and moving the bar in and out of engagement with the clips 54 and 55. A stop 57 is provided on the back face of the rear wall 16 against which the heavier or longer end of the bar 47a will engage, when in its horizontal non-holding position. When the bar 47a is in its full-line position shown in FIGURE 13, it is obvious that the section *z* of the top 18 will be firmly maintained in the position, shown in FIGURE 10.

This modified form of the invention further includes a shelf member 60 of a width to cover the cut-away portion 19a in the bottom wall 19 and of a length to extend substantially from one side wall 17 to the other. This shelf-member 60 is hinged at one end, as at 61, to the inner face of a side wall 17 of the cabinet so that it may lie substantially parallel to said side wall, when in inoperative position, and held in this upright position by a magnetic-latch 62, or other suitable means, in order that it may be readily released to swing downwardly, in the direction of the arrows, shown in FIGURE 11, to cover the cut-out portion 19a in the bottom wall 19, as shown by dotted line in FIGURE 11. When in its dotted line position, the shelf 60 provides additional space upon which various articles may be placed for use as needed and, when the device is to be used as a secretariat, the shelf 60 will be swung to the full-line position shown in FIGURE 11 and retained in that position by the fastener 62.

Figures 13, 14, 15, 16, 17, 18, 19:
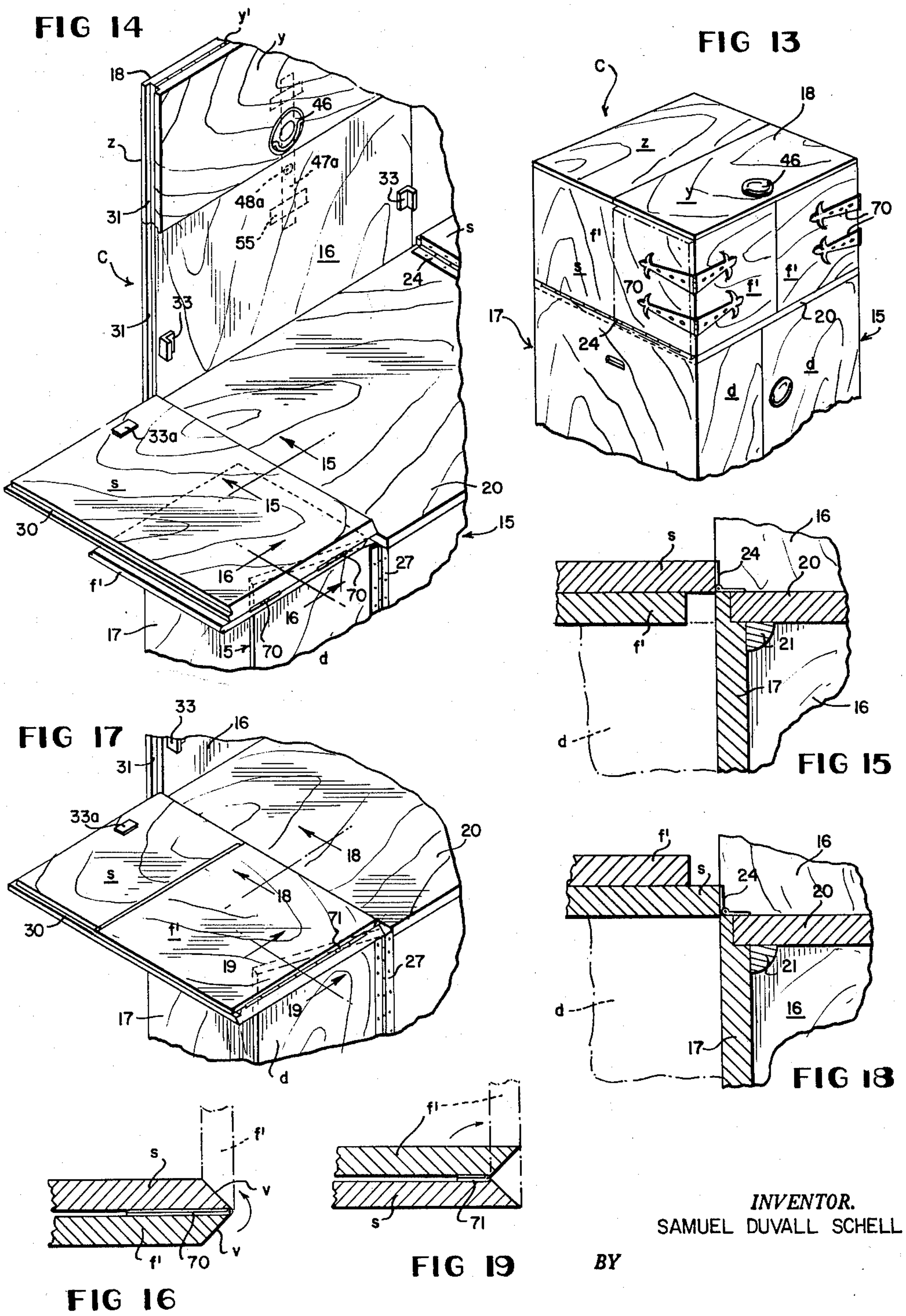
FIGURE 13 is a fragmentary perspective view of the upper portion of the cabinet with a further modified arrangement of the foldable parts and with said parts in closed position.
FIGURE 14 is a fragmentary perspective view of the cabinet shown in FIGURE 13 with foldable parts in opened position.
FIGURE 15 is a detailed sectional view taken substantially on line 15—15 of FIGURE 14.
FIGURE 16 is a detailed sectional view taken substantially on line 16—16 of FIGURE 14.
FIGURE 17 is a fragmentary perspective view similar to FIGURE 14, but showing a still further modification of the arrangement of the foldable parts of the cabinet as shown in FIGURES 13 and 14.
FIGURE 18 is a detailed sectional view taken substantially on line 18—18 of FIGURE 17.
FIGURE 19 is a detailed sectional view taken substantially on line 19—19 of FIGURE 17.

The secretariat-convertible cabinet, which is shown in FIGURES 13 to 19 inclusive, is substantially the same in functional utility and service as in the proceeding figures described above, except that the foldable arrangement of certain parts has been varied in order that the upper section *f* of the front wall 15 is not hinged to or carried by the top wall 18. In FIGURES 13 and 14 the upper section of the front wall 15, corresponding to the front section *f* in the preceding figures of the drawing, is composed of two door-like panels *f'*, each being hinged, as at 70, to the vertical edge of the adjacent side wall section *s* of the side wall 17, so that each front door panel *f'* may be swung outwardly and against the outer face of the side wall sections *s* to which it is hinged, as indicated in dotted lines in FIGURE 13. In this form of the invention, the upper door sections *f'* will be in horizontal alignment, when closed, and will lie flush with and above, and thus exposing, the end surface of the extended front edge of the partition 20; and the lower door panels *d* of the front wall 15 will likewise underlie the extended front edge of the partition 20, as shown in FIGURE 13.

Also, in this form of the invention, the top wall 18 may be, and preferably is, divided transversely into two sections *y* and *z* (similarly as shown in FIGURES 10, 11 and 12, but without the additional division to form the section *x*) which are hinged together as at *y'*. Otherwise the cabinet shown in FIGURES 13, 14 15 and 16 may be the same in all respects as described above and shown in connection with FIGURES 1 to 12. Moreover, while the hinges 70 are shown as strap-hinges, piano-hinges may be employed, if desired, and their leaves may extend between the beveled surface *v* shown in FIGURE 16 and secured to the inner faces of *s* and *f'*. Any suitable fastener means may be employed to latch the door panels *f'* and *d* in opened or closed positions.

Figures 3, 4, 5:
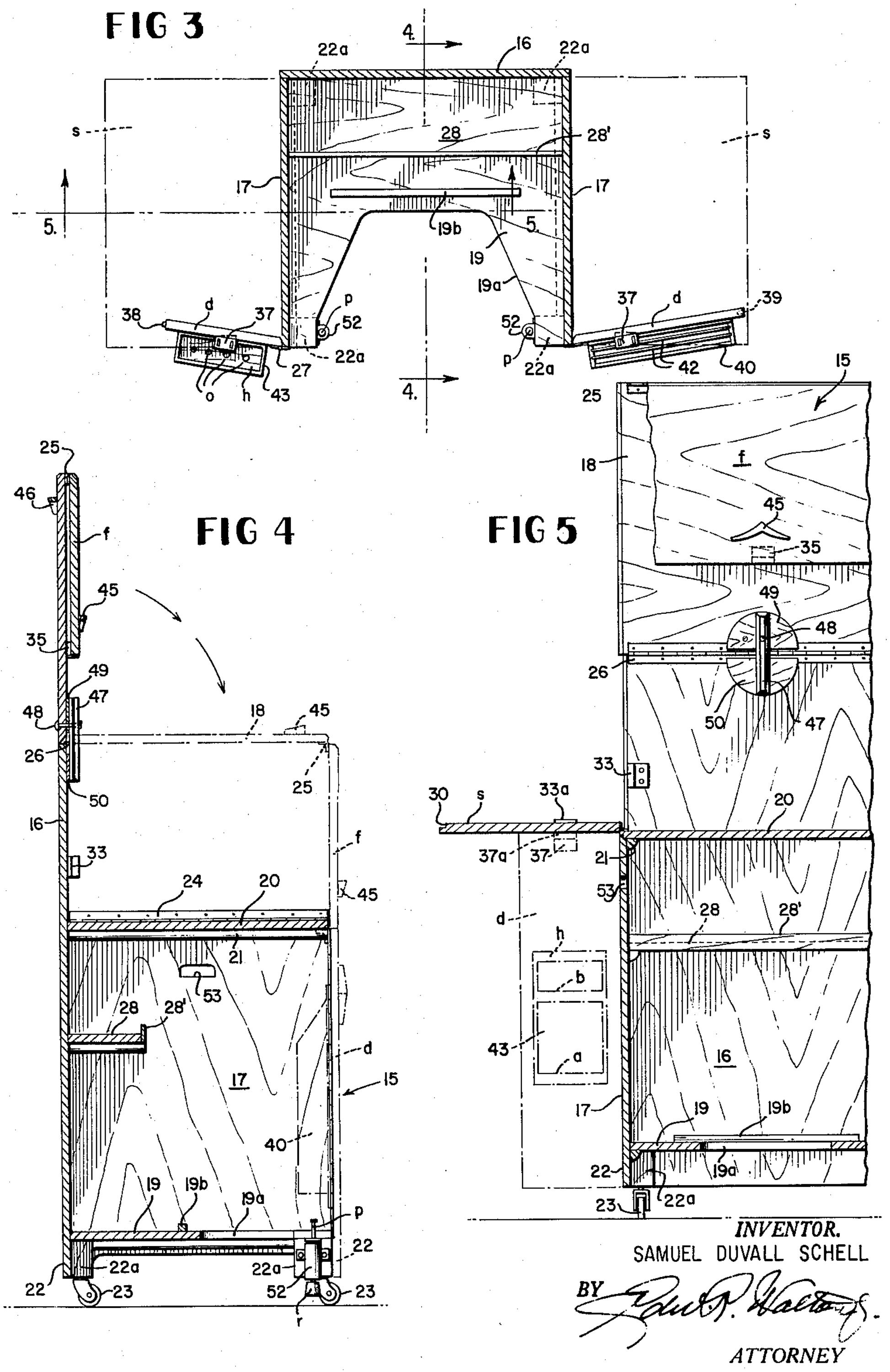
FIGURE 3 is a transverse sectional view taken substantially on line 3—3 of FIGURE 2.
FIGURE 4 is a vertical sectional view taken substantially on line 4—4 of FIGURE 3.
FIGURE 5 is a vertical sectional view taken substantially on line 5—5 of FIGURE 3.

The form of the invention shown in FIGURES 17, 18 and 19 is substantially the same as described in connection with FIGURES 13 to 16, except that the upper front door panels *f'* are hinged, as at 71, to swing inwardly of their respective side wall sections *s*, as shown in FIGURES 17 and 19, and the sections *s* will rest directly upon the top edges of the lower door panels *d*, when opened, with the front panel *f'* lying upon the sections *s*, as in FIGURES 1, 2 and 5. In this form of the cabinet, the upper edges of the doors *d* will extend to and lie flush with the upper surface of the partition 20, when closed. The lower edges of doors *f'* will lie flush with the tops of doors *d*, the outer edge of partition 20 being covered.

With the constructional arrangement shown in FIGURES 13 to 19, inclusive, the cabinet may be opened to form a desk or beverage bar by raising the distal end of the top wall 18 to a vertical position, while causing the top section *y* to fold downwardly to a parallel position with its section *z*, and then actuating the fastener 47*a*, as previously described in connection with FIGURES 10 to 12, to hold the section *z* in vertical position. The doors *d* are then swung open to the position shown in FIGURES 14 and 17. In the case of the form shown in FIGURES 13 to 16, the upper door panels *f'* are then swung outwardly on the hinges 70 to lie against the outer faces of the side wall sections *s*, respectively; and then the side wall sections *s* are swung outwardly and downwardly to rest on the top edges of the lower door panels *d* with the upper front door panels *f'* lying between their respective sections *s* and the underlying door panels *d*, thus filling the space corresponding to the thickness of the partition 20 in order that the unfolded section *s* will provided a clear, smooth and level tablelike extension of the partition 20. However, with the form shown in FIGURES 17 to 19, the side wall sections *s* are swung outwardly and downwardly to a horizontal position (after the top 18 and doors *d* are opened) to rest on the upper edge of their adjacent door *d*, and the upper doors *f'* are then swung downwardly to rest upon and parallel with their respective side wall sections *s*. The cabinet may be closed by moving the parts, just described, to their original position in reversed order.

FIGURE 17 shows the divided front sections *f'* and *f'* folded in, on hinges at sides, and resting flat on sides *s* when *s* is folded out in horizontal position as a shelf. The magnetic latches 37 on lower doors *d* fit into the cut-outs 40 on main shelf 20 when doors *d* are closed, making the top of doors level with the top level of shelf 20, and the lower edge of upper doors *f'*. On the lower edges of the doors *f'* are the metal plates to engage with latches 37, the tops of which will be on a level with the top of shelf 20 through the cut-out fronts of 20. These latches and the fit of the two upper and lower door secions *f'* and *d* at the front-upper level of shelf 20 supply rigidity in closed position of the whole front wall.

The top of front sections *f'* inside, the center line division of the upper front sections *f'*, and the forward underside of the top 18*y* are all rabbeted to fit and interlock and secured by the two magnetic latches inside *d* and serve to provide rigidity of closure and dust proofing of the upper compartment of the cabinet, thus to protect the enclosed typewriter or other item.

From the above description, when considered with the accompanying drawings, it will be manifest that the aforesaid objects of the invention are attained and that the secretariat-convertible cabinet of this invention has many utilitarian advantages, as well as being an ornamental furniture piece when not serving its utilitarian purposes.

Also, this cabinet is a self-contained unitary structure, in that there are no separable or detachable parts, which may become lost, and in that its conversion from an ornamental furniture piece to another utilitarian use is accomplished by the mere unfolding of movable parts, and conversely.

Having thus described the invention and the manner in which it may be performed, it is to be understood that changes and modifications may be made in details of construction or in the specific arrangement of parts herein shown and described and that such changes as fall within the scope of the appended claims are within the purview of the present invention and contemplated thereby.

That which is claimed, as new and to be secured by Letters Patent, is:

1. A secretariat-convertible cabinet of the kind described, comprising, in combination, a front wall, two side walls, a rear wall, a bottom wall and a top wall mounted for movement to expose the interior of the cabinet at its top, a horizontal partition mounted within the cabinet at a distance below the top wall to provide an upper compartment within the cabinet and positioned at a height to provide a table, the upper portion of said front wall forming the front wall of said compartment being movably mounted to expose the interior of said upper compartment within said cabinet, the portions of said side walls upwardly from said partition being mounted on the cabinet to swing outwardly and downwardly to form horizontal side extensions of said partition, when said top wall and upper portion of said front wall are moved to expose said upper compartment, said upper portion of said front wall comprising two door panels, each hinged to the vertical edge portion of its adjacent swingable side wall portion so as to lie adjacent their respective side wall portions and substantially parallel therewith when said swingable side wall portions are moved to a horizontal position to provide table-like extensions in said partition, means for maintaining said side wall portions in their horizontal extended position, and means for maintaining said side and front wall portions in their closed positions.

2. A secretariat-convertible cabinet as set forth in claim 1, wherein said two door panels are each hinged to the vertical edge portion of its adjacent swingable side wall portion so as to be swung outwardly against the outer face of its adjacent side wall portion and to lie between the upper edge of one of said lower doors and its side wall portion, when each of said door panels is opened and the respective side wall portion is swung downwardly to provide a table-like extension of said partition.

3. A secretariat-convertible cabinet according to claim 1, wherein the top wall is hinged at its rear edge portion to said back wall and is composed of two transverse sections hinged together so that said sections may be moved relatively to one another and into face-to-face relationship, and means for maintaining said top wall in open position.

4. The invention as defined in claim 1 wherein the upper portion of said front wall comprises two horizontally aligned door panels, each door panel being hinged to said vertical edge portion as to swing inwardly against the inner face of its adjacent side wall portion when said door panels are opened and said side wall portions are swung downwardly, thus to provide table-like extensions of said partition.

5. A convertible cabinet as set forth in claim 1 having a bottom wall cut-away for a distance at its front portion and a cover for the said cut-away portion hinged at one end to a side wall of said cabinet and adapted to be swung to a substantially vertical inoperative position thereagainst and to a substantially horizontal position to cover said cut-away to provide a supporting surface, and releasable means for maintaining said cover in its vertical position.

References Cited in the file of this patent

UNITED STATES PATENTS

| | | |
|---|---|---|
| 1,432,663 | Brandts | Oct. 17, 1922 |
| 2,206,004 | Ford | June 25, 1940 |
| 2,262,222 | Castricone | Nov. 11, 1941 |
| 2,268,199 | Greer | Dec. 30, 1941 |
| 2,401,526 | Ullman | June 4, 1946 |
| 2,725,274 | Stivale | Nov. 29, 1955 |

FOREIGN PATENTS

| | | |
|---|---|---|
| 10,237 | Great Britain | of 1887 |